United States Patent
Kocal et al.

(10) Patent No.: US 8,404,910 B2
(45) Date of Patent: Mar. 26, 2013

(54) LOW OXYGEN BIOMASS-DERIVED PYROLYSIS OILS AND METHODS FOR PRODUCING THE SAME

(75) Inventors: Joseph A. Kocal, Glenview, IL (US); Richard Marinangeli, Arlington Heights, IL (US); Francis Stephen Lupton, Evanston, IL (US); Lisa King, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 630 days.

(21) Appl. No.: 12/707,408

(22) Filed: Feb. 17, 2010

(65) Prior Publication Data

US 2011/0201854 A1    Aug. 18, 2011

(51) Int. Cl.
  *C07C 1/00*    (2006.01)
(52) U.S. Cl. ........... 585/240; 585/242; 585/733; 44/605
(58) Field of Classification Search .................. 585/240, 585/242, 733; 44/606, 605; 518/702, 715
See application file for complete search history.

(56) References Cited

U.S. PATENT DOCUMENTS

| 5,961,786 | A | 10/1999 | Freel et al. | |
|---|---|---|---|---|
| 6,193,837 | B1 | 2/2001 | Agblevor et al. | |
| 7,960,598 | B2 * | 6/2011 | Spilker et al. | 585/240 |
| 7,982,075 | B2 | 7/2011 | Marker et al. | |
| 7,998,455 | B2 * | 8/2011 | Abbas et al. | 423/648.1 |
| 8,147,766 | B2 * | 4/2012 | Spilker et al. | 422/187 |

| 2007/0094929 | A1 | 5/2007 | Kang et al. |
|---|---|---|---|
| 2008/0307703 | A1 | 12/2008 | Dietenberger et al. |
| 2009/0084666 | A1 | 4/2009 | Agrawal et al. |

FOREIGN PATENT DOCUMENTS

| BR | 8304158 | 7/1984 |
|---|---|---|
| CN | 101045524 | 10/2007 |
| CN | 101294085 | 10/2008 |
| CN | 101318622 | 12/2008 |
| CN | 101544901 | 9/2009 |
| CN | 1015530347 | 10/2009 |
| JP | 2007229548 | 9/2007 |
| WO | 2008092557 A2 | 8/2008 |

OTHER PUBLICATIONS deWild, Paul, et al., Lignin Valorsation for chemicals and (transportation) fuels via (catalytic) pyrolysis and hydrodeoxgenation, Energy Research Centre at the Netherlands, www.ecn.nl. Sep. 24, 2009.

(Continued)

*Primary Examiner* — Nina Bhat
(74) *Attorney, Agent, or Firm* — David J Piasecki

(57) ABSTRACT

Methods are provided for producing low oxygen biomass-derived pyrolysis oil from carbonaceous biomass feedstock. The carbonaceous biomass feedstock is pyrolyzed in the presence of a steam reforming catalyst to produce char and pyrolysis gases. During pyrolysis, a portion of the oxygenated hydrocarbons in the pyrolysis gases is converted into hydrocarbons by steam reforming also yielding carbon oxides and hydrogen gas. The hydrogen gas at least partially deoxygenates a residual portion of the oxygenated hydrocarbons. Additional hydrogen gas may also be produced by water-gas shift reactions to deoxygenate the residual portion of the oxygenated hydrocarbons in the pyrolysis gases. Deoxygenation may occur in the presence of a hydroprocessing catalyst. A condensable portion of the pyrolysis gases is condensed to form low oxygen biomass-derived pyrolysis oil.

20 Claims, 2 Drawing Sheets

OTHER PUBLICATIONS

Aho, A., et al., Catalytic pyrolysis of woody biomass in a fluidized bed reactor; Influence of zeollites structure, Science Direct, Fuel 87, Feb. 19, 2008, 2493-2501.

Padmaja, K.V., et al., Upgrading of Candelilla biocrude to hydrocarbon fuels by fluid catalytic cracking, ScienceDirect, Biomass and Bioenergy 33, Aug. 11, 2009, 1664-1669.

Czernik, S.,et al., Hydrogren by Catalytic Steam Reforming of Liquid Byproducts from Biomass Thermoconversion Processes, Ind. Eng. Chem. Res. 2002, 41, American Chemical Society, Jul. 19, 2002, 4209-4215.

Valle, B., et al., Integration of Thermal Treatment and Catalytic Transformation for Upgrading Biomass Pyrolysis Oil, International Journal of Chemical Reactor Engineering, vol. 5, Article A86, 2007.

Elliott, D., Historical Developments in Hydroprocessing Bio-oils, Energy & Fuels, 21, American Chemical Society, May 2, 2007, 1792-1815.

Lappas, A.A., Production of biofuels via co-processing in conventional refining process, Catalysis Today, 145, Elsevier, Jul. 1, 2008, 55-62.

Atutxa, A., et al., Kinetic Description of the Catalytic Pyrolysis of Biomass in a Conical Spouted Bed Reactor, Energy & Fuel, 2005, 19, American Chemical Society, Mar. 19, 2005, 765-774.

Hogan, E., Thermo-Catalytic Cracking of Wood to Transportation Fuels using the RTP Process, Ensyn Technologies, Inc, Efficiency and Alternative Energy Technology Branch, National Resources Canada, Ottawa, Ontario.

Bridgewater, A.V., Principles and practices of biomass fast pyrolysis processes for liquids, Journal of Analytical and Applied Pyrolysis, 51 1999, Elsevier, 3-22.

Bimbela, F., et al., Hydrogen production by catalytic steam reforming of acetic acid, a model compound of biomass pyrolysis liquids, J. Ana App. Pyrolysis, 79(2007) 112-120.

Iojoiu, E., et al., Hydrogen production by sequential cracking of biomass-derived pyrolysis oil over noble metal catalysts supported on ceria-zirconia, Applied Catalysis A: General 323 (2007) 147-161.

Meier, D.,et al., Pyrolysis and Hydroplysis of Biomass and Lignins-Activities at the Institute of Wood Chemistry in Hamburg, Germany, Federal Research Center for Forestry and Forest Products, Hamburg, Germany.

Radlein, D., et al., Hydrocarbons from the Catalytic Pyrolysis of Biomass, Energy & Fuels, 1991, 5, American Chemical Society, 1991, 760-763.

Grange, P., et al., Hydrotreatment of pyrolysis oils from biomass: reactivity of the various categories of oxygenated compounds and preliminary techno-economical study, Catalysis Today 29 (1996) 297-301.

Olazar, M., et al., Pyrolysis of Sawduest ina Conical Spouted-Bed Reactor with a HZSM-5 Catalyst, AIChE Journal, May 2000 vol. 46., No. 5.

Nowakowski, D., et al., Potassium catalysis in the pyrolysis behaviour of short rotation willow coppice, ScienceDirect, Fuels 86, (2007) 2389-2402.

Di Blasi, C.,et al., Effects of Potassium Hydroxide Impregnation of Wood Pyrolysis, American Chemical Society, Energy & Fuels (2009) 23, 1045-1054.

Carlon, T.,et al., Aromatic Production from Catalytic Fast Pyrolysis of Biomass-Derived Feedstocks, Top Cat (2009) 52:241-242.

Lappas, A.A., et al., Biomass pyrolysis in a circulating fluid bed reactor for the production of fuels and chemicals, Fuels 81 (2002) 2087-2095.

Antonakou, E., et al., Evaluation of various types of Al-MCM-41 materials as catalysts in biomass pyrolysis for the production of bio-fuels and chemicals, ScienceDirect, Fuels 85 (2006) 2202-2212.

Carlson, T.,et al., Green Gasoline by Catalytic Fast Pyrolysis of Solid Biomass Derived Compounds, ChemSusChem, 2008.

Jackson, M.,et al., Screening heterogenous catalysts for the pyrolysis of lignin, J. Anal. Appl. Pyrolysis 85 (2009) 226-230.

Adam, J., et al., Pyrolysis of biomass in the presence of Al-MCM-41 type catalysts, ScienceDirect, Fuel, 84 (2005) 1494-1502.

Hughes, J., et al., Structural variations in natural F, OH and Cl apaties, American Mineralogists, vol. 74, 1989, 870-876.

Czernik, S., et al., Hydrogen from biomass-production by steam reforming of biomass pyrolysis oil, ScienceDirect, Catalysis Today, 129 (2007) 265-168.

Hoekstra, E., et al., Fast Pyrolysis of Biomass in a Fluidized Bed Reactor: In Situ Filtering of the Vapors, American Chemical Society, Ing. Eng. Chem. Res 2009, 48, 4744-4756.

* cited by examiner

US 8,404,910 B2

LOW OXYGEN BIOMASS-DERIVED PYROLYSIS OILS AND METHODS FOR PRODUCING THE SAME

FIELD OF THE INVENTION

The present invention generally relates to biofuels and processes for producing biofuels, and more particularly relates to low oxygen biomass-derived pyrolysis oils and methods for producing the same.

DESCRIPTION OF RELATED ART

Fast pyrolysis is a thermal process during which solid carbonaceous biomass feedstock, i.e., "biomass", such as wood waste, agricultural waste, etc., is rapidly heated to pyrolysis temperatures of about 300° C. to about 800° C. in the absence of air using a pyrolysis reactor. Under these conditions, solid products, liquid products and gaseous pyrolysis products are formed. A condensable portion (vapors) of the gaseous pyrolysis products is condensed into biomass-derived pyrolysis oil. The conventional biomass-derived pyrolysis oil is generally thermally unstable, corrosive, and has a low energy density. The low energy density and poor thermal stability of the biomass-derived pyrolysis oil is attributable in large part to oxygenated hydrocarbons in the oil, which undergo secondary reactions during storage. Such oxygenated hydrocarbons include carboxylic acids, phenols, cresols, aldehydes, etc. The oxygenated hydrocarbons in the oil are derived from oxygenated hydrocarbons in the gaseous pyrolysis products produced during pyrolysis.

Biomass-derived pyrolysis oil can be burned directly as fuel for certain boiler and furnace applications, and can also serve as a potential feedstock in catalytic processes for the production of biofuels in petroleum refineries or in stand-alone process units. Biomass-derived pyrolysis oil has the potential to replace up to 60% of transportation fuels, thereby reducing the dependency on conventional petroleum and reducing its environmental impact. However, conversion of biomass-derived pyrolysis oil into such biofuels and chemicals requires partial or full deoxygenation of the biomass-derived pyrolysis oil. Such deoxygenation can proceed via two main routes, namely the elimination of either water or $CO_2$. While some deoxygenation occurs from the elimination of carbon oxides during conventional pyrolysis of the carbonaceous biomass feedstock, such deoxygenation is insufficient to produce high energy density, thermally stable biomass-derived pyrolysis oils from which biofuels and chemicals are derived.

Most efforts to deoxygenate the biomass-derived pyrolysis oils involve secondary upgrading of the biomass-derived pyrolysis oils after their production, i.e., post-pyrolysis. Such secondary upgrading adds unnecessary cost and complexity to the production of low oxygen biomass-derived pyrolysis oil.

Accordingly, it is desirable to provide methods for producing low oxygen biomass-derived pyrolysis oil during the pyrolysis process, before the oil is formed, thereby potentially eliminating or substantially reducing the severity of secondary upgrading of the oils. It is also desirable to produce low oxygen biomass-derived pyrolysis oils having increased energy density, thermal stability and lower corrosivity. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for producing low oxygen biomass-derived pyrolysis oil from carbonaceous biomass feedstock. In accordance with one exemplary embodiment, a method for producing low oxygen biomass-derived pyrolysis oil comprises pyrolyzing the carbonaceous biomass feedstock to produce char and pyrolysis gases. The pyrolysis gases comprise principally oxygenated hydrocarbons and steam. The carbonaceous biomass feedstock is pyrolyzed in the presence of a steam reforming catalyst to form carbon monoxide, carbon dioxide, and hydrogen gas and to convert a portion of the oxygenated hydrocarbons into hydrocarbons by steam reforming. The hydrogen gas at least partially deoxygenates a residual portion of the oxygenated hydrocarbons. A condensable portion of the pyrolysis gases is condensed to form low oxygen biomass-derived pyrolysis oil.

Methods are provided for producing low oxygen biomass-derived pyrolysis oil in accordance with yet another exemplary embodiment of the present invention. The method comprises introducing the carbonaceous biomass feedstock into a pyrolysis reactor maintained at pyrolysis temperatures to produce char and pyrolysis gases. The pyrolysis gases comprise oxygenated hydrocarbons, methane, and steam. A portion of the oxygenated hydrocarbons is steam reformed in the pyrolysis reactor in the presence of an effective amount of a steam reforming catalyst to convert a portion of the oxygenated hydrocarbons into hydrocarbons and form carbon monoxide, carbon dioxide, and hydrogen gas. A residual portion of the oxygenated hydrocarbons is deoxygenated with hydrogen gas in the presence of an effective amount of a hydroprocessing catalyst to form water and to at least partially convert the residual portion of the oxygenated hydrocarbons into hydrocarbons. A condensable portion of the pyrolysis gases is condensed into low oxygen biomass-derived pyrolysis oil.

Methods are provided for reducing an oxygen level in condensable pyrolysis gases comprising oxygenated hydrocarbons and steam to produce low oxygen biomass-derived pyrolysis oil therefrom in accordance with yet another exemplary embodiment of the present invention. The method comprises steam reforming a portion of the oxygenated hydrocarbons in the presence of a steam reforming catalyst to convert a portion of the oxygenated hydrocarbons into hydrocarbons and produce carbon monoxide, carbon dioxide and hydrogen gas. Additional hydrogen gas may optionally be produced by reacting steam with the carbon monoxide in the presence of a high temperature water-gas shift catalyst, a low temperature water-gas shift catalyst, or both. Water is produced in the presence of a hydroprocessing catalyst by reacting the hydrogen gas from the steam reforming step, and optionally the producing additional hydrogen step, with the oxygen removed by converting residual oxygenated hydrocarbons into hydrocarbons.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to low oxygen biomass-derived pyrolysis oils and methods for producing the same. The low oxygen biomass-derived pyrolysis oils produced according to exemplary embodiments of the present invention are substantially fully hydrocarbon products (i.e., products comprising only hydrogen and carbon atoms) making them more suitable for processing into biofuels and chemicals. The methods comprise pyrolyzing carbonaceous biomass feedstock in the presence of one or more catalysts whereby oxygenated hydrocarbons produced as pyrolysis intermediates are substantially deoxygenated to yield substantially fully hydrocarbon pyrolysis gases, a condensable portion of which is condensed into low oxygen biomass-derived pyrolysis oil. "Hydrocarbons" as used herein are organic compounds that contain principally only hydrogen and carbon, i.e., "hydrocarbons" are oxygen-free. "Oxygenated hydrocarbons" as used herein are organic compounds containing hydrogen, carbon, and oxygen.

It should be appreciated that while the oil produced according to exemplary embodiments of the present invention is generally described herein as a "low oxygen biomass-derived pyrolysis oil", this term generally includes any oil produced having a lower oxygen concentration than conventional biomass-derived pyrolysis oil. The term "low oxygen biomass-derived pyrolysis oil" includes oil having no oxygen.

Figure 1:
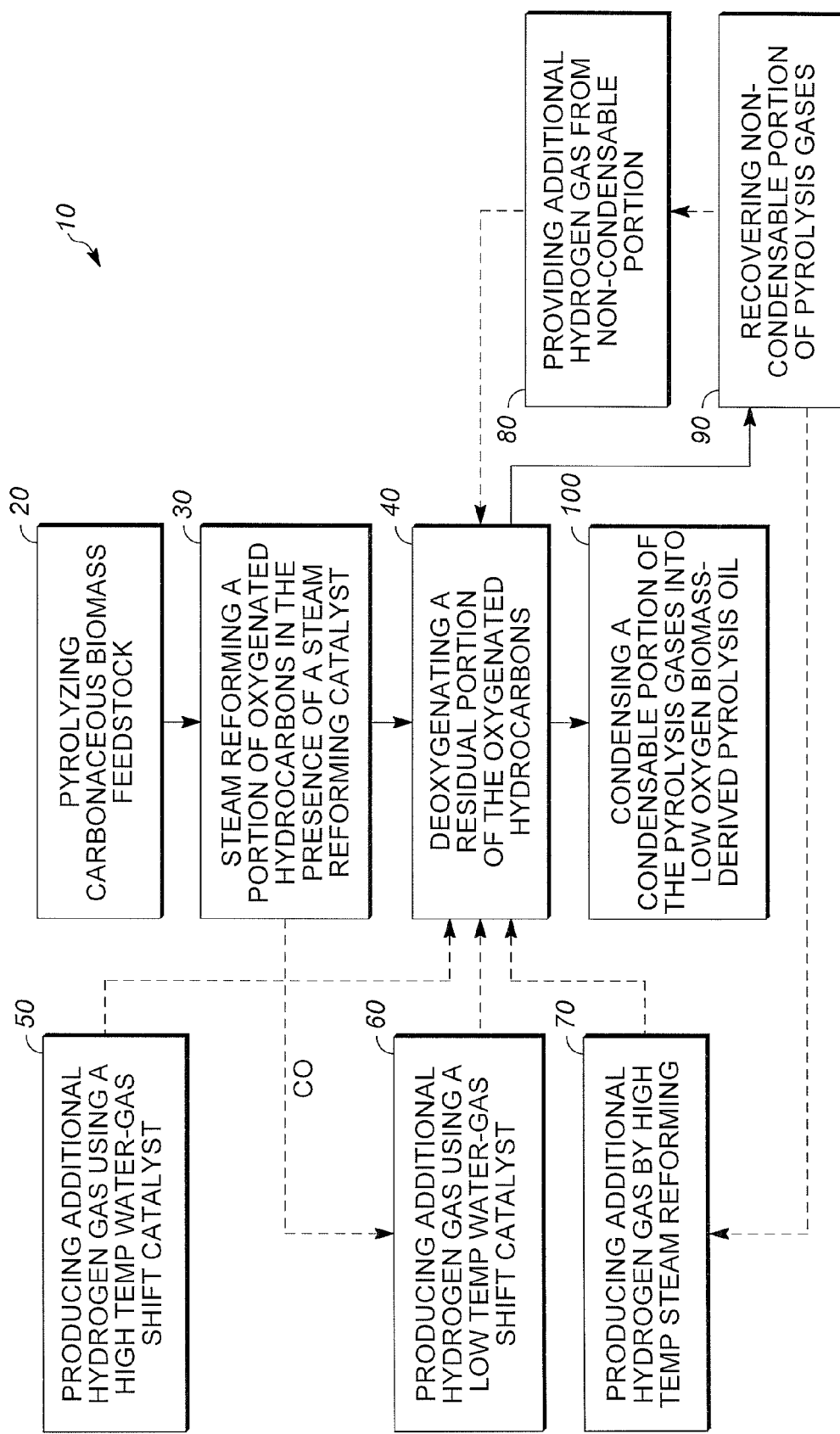
FIG. 1 is a flow chart of methods for producing low oxygen biomass-derived pyrolysis oils, according to exemplary embodiments of the present invention.
Figure 2:
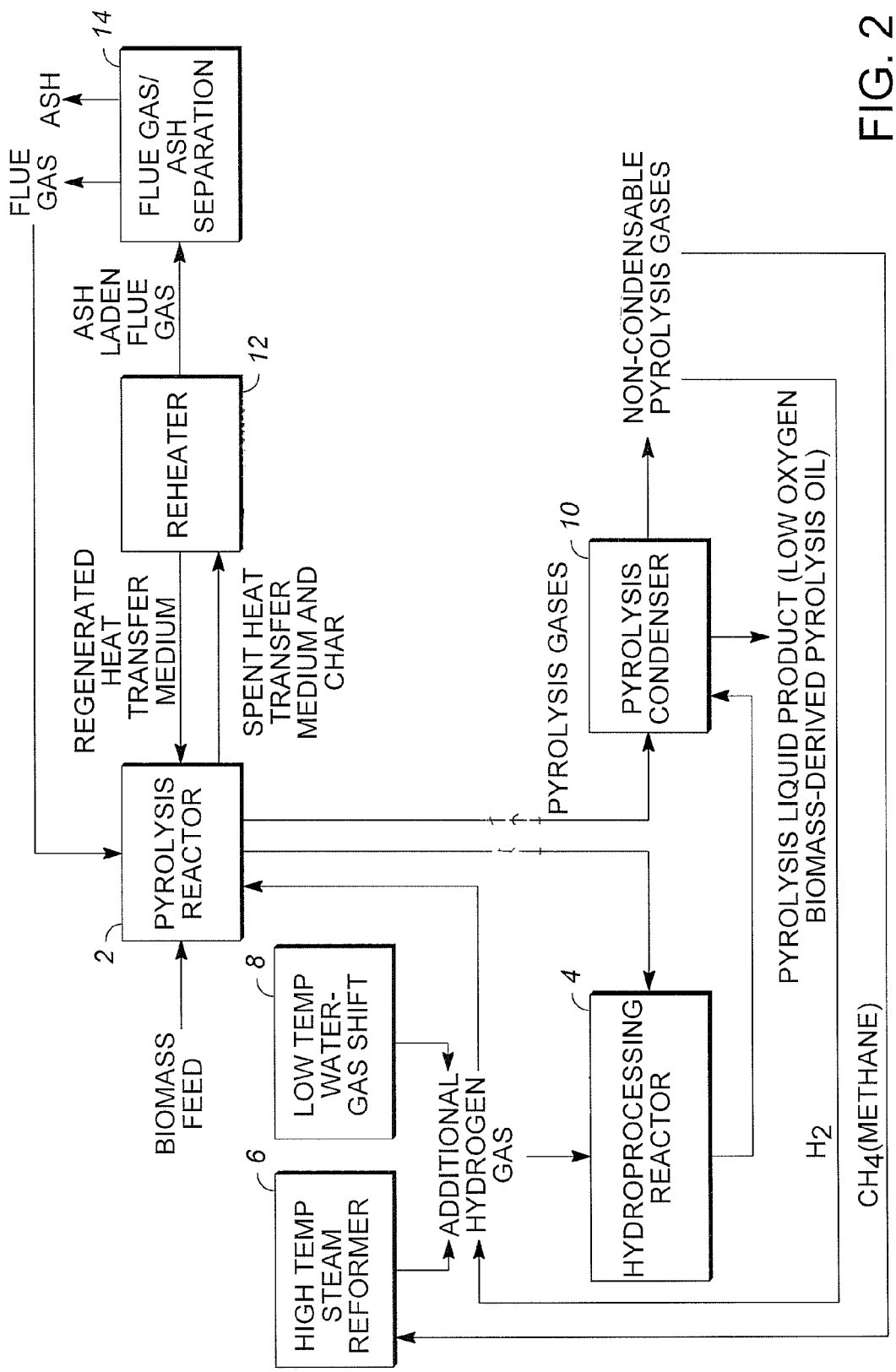
FIG. 2 is a schematic diagram of an exemplary pyrolysis system for performing the methods of FIG. 1 to produce low oxygen biomass-derived pyrolysis oils, according to exemplary embodiments of the present invention.

As shown in FIGS. 1 and 2, in accordance with an exemplary embodiment, a method 10 for producing low oxygen biomass-derived pyrolysis oil begins by introducing carbonaceous biomass feedstock (hereinafter "biomass") into a pyrolysis reactor 2 and pyrolyzing the biomass (step 20). The biomass is pyrolyzed in the presence of at least a steam reforming catalyst (step 30) for a sufficient time to produce char and pyrolysis gases comprising a variety of oxygenated hydrocarbons, heavy hydrocarbons which include partially depolymerized biomass and light ($C_1$-$C_4$) hydrocarbons, carbon oxides such as carbon dioxide and carbon monoxide (collectively "carbon oxides"), hydrogen gas, and steam. While FIG. 1 shows steps 20 and 30 as separate subsequent steps for illustrative purposes, it will be understood that pyrolyzing (step 20) and steam reforming (step 30) are being performed substantially simultaneously in the pyrolysis reactor 2. The steam reforming catalyst catalyzes a steam reforming reaction which requires a source for steam. The steam may be generated from the moisture in the carbonaceous biomass feedstock. The amount of steam generated during pyrolysis may be increased by little or no drying of the biomass or by the addition of supplemental steam to the pyrolysis reactor. Sufficient process steam may be generated within the pyrolysis reactor by using biomass having a moisture content in the range of about 1 to about 50 weight percent moisture. In such instances, substantially all steam for steam reforming is generated within the pyrolysis reactor. Conversely, if supplemental steam is readily available from an external source, it may be more desirable to dry the biomass to about 5 to about 10 weight percent moisture by methods known in the art prior to introduction into the pyrolysis reactor. For example, the moisture in the biomass may be reduced in a dryer, by air drying and/or low level heat available from other processes, or by a methane or carbon oxide gas stream, as hereinafter described, and steam added at a desired stage in the process. Grinding of the biomass may also be performed prior to pyrolysis.

Various types of biomass may be pyrolyzed. Virtually any form of biomass can be considered for pyrolysis to produce biomass-derived pyrolysis oil. Biomass-derived pyrolysis oil may be derived from biomass material such as wood, agricultural wastes/residues, nuts and seeds, algae, grasses, forestry residues, municipal solid waste, construction/demolition debris, cellulose and lignin, or the like.

The biomass may be pyrolyzed using various pyrolysis methods. Fast pyrolysis methods of rapidly imparting a relatively high temperature to feedstocks for a very short residence time, then rapidly reducing the temperature of the pyrolysis products before chemical equilibrium can occur are preferred. By this approach, the complex structures of the biomass are broken into reactive chemical fragments which are initially formed by depolymerization and volatilization reactions, but do not persist for any significant length of time. Fast pyrolysis is an intense, short duration process that can be carried out in a variety of pyrolysis reactors such as fixed bed pyrolysis reactors, fluidized bed pyrolysis reactors, circulating fluidized bed reactors (CFBR), or other pyrolysis reactors capable of fast pyrolysis as known in the art. For example, in an exemplary fluidized bed pyrolysis reactor, carbonaceous biomass feedstock is thermally converted (i.e., pyrolyzed) at pyrolysis temperatures of about 300° C. to about 800° C. in the presence of a heat transfer medium. The heat transfer medium comprises inert solids such as sand, catalytic solids, or a combination thereof. The catalytic solids may comprise the steam reforming catalyst and at least one of a hydroprocessing catalyst and a high temperature water gas shift catalyst, in accordance with exemplary embodiments of the present invention. The heat transfer medium is provided in a fluidized state and maintained at a temperature suitable for pyrolysis to pyrolyze the carbonaceous biomass feedstock. The heat transfer medium is fluidized by a fluidizing gas. Either flue gases produced during pyrolysis or a non-condensable portion of the pyrolysis gases may be compressed and fed into the pyrolysis reactor as a fluidizing gas for bed fluidization. The heat transfer medium forms a fluidized bed within the pyrolysis reactor.

An exemplary circulating bed transport fast pyrolysis reactor is described, for example, in U.S. Pat. No. 5,961,786. As described therein, the carbonaceous biomass feedstock, a non-oxidative fluidizing transport gas such as flue gas, and a heat transfer medium are rapidly mixed in a thermal mixing section of a pyrolysis reactor base section, then transported upward through an entrained-bed tubular pyrolysis reactor. After pyrolysis, a cyclonic hot solids recirculation system separates the solid inorganic heat transfer medium from the non-condensable gases and condensable gases (vapors) and returns the solid inorganic heat transfer medium to the mixing section to be used again. The heat required to drive the pyrolysis process is transferred to the mixing and reaction zones principally by the recirculated heat transfer medium. Typically, there is no oxidation (combustion) occurring in the mixing and reaction zones to supply direct process heat as preferably there is very little oxygen present. Direct or indirect combustion of char or gas, or externally supplied fuel, or indirect electrical resistance heating, may be employed to heat the recirculated heat transfer medium before introduction into the mixing section of the pyrolysis reactor.

It is to be understood that the fast pyrolysis methods described above are exemplary. The exemplary embodiments are not limited to fast pyrolysis methods, any particular pyrolysis system, method, or pyrolysis reactor. For example only, the carbonaceous biomass feedstock may be mixed with the heat transfer medium prior to introduction into the pyrolysis reactor.

As described previously, the pyrolysis gases, which are derived from pyrolysis of the carbonaceous biomass feedstock, comprise a variety of oxygenated hydrocarbons. Such oxygenated hydrocarbons include carboxylic acids, phenols, cresols, aldehydes, etc., that contribute to the thermal instability and corrosivity of conventional pyrolysis products. At pyrolysis temperatures of about 300° C. to about 800° C., the steam reforming catalyst catalyzes a steam reforming reaction between the steam and a portion of the oxygenated hydrocarbons to convert a portion of the oxygenated hydrocarbons into hydrocarbons and form the hydrogen gas and the carbon oxides in the pyrolysis gases. The oxygen contained in the oxygenated hydrocarbons is removed during steam reforming as the carbon oxides. Removal of the oxygen from oxygenated hydrocarbons converts them into hydrocarbons.

Steam reforming of all the oxygenated hydrocarbons in the pyrolysis gases would yield only carbon oxides and hydrogen gas, as shown by example below for acetic acid, an oxygenated hydrocarbon:

$$CH_3COOH + 2H_2O \rightarrow 2CO_2 + 4H_2.$$

However, by steam reforming a controlled amount of the oxygenated hydrocarbons, a portion of the oxygenated hydrocarbons in the pyrolysis gases are converted into hydrocarbons, and hydrogen gas and carbon oxides are also formed. Typically, steam reforming between about 20% to about 40% of the biomass, preferably about 30%, will produce sufficient hydrogen gas to deoxygenate the oxygenated hydrocarbons. The amount of steam reforming can be controlled by the amount of steam, the amount of steam reforming catalyst relative to biomass, the temperature, and the contact time between the steam forming catalyst and the biomass as well known to one skilled in the art. In addition to conversion of a portion of the oxygenated hydrocarbons in the pyrolysis gases into hydrocarbons, certain of the heavier hydrocarbons in the pyrolysis gases react with the steam in the presence of the steam reforming catalyst to form carbon oxides and hydrogen gas.

In one embodiment, the effective amount of the steam reforming catalyst is expressed in a catalyst-to-biomass ratio of about 0.25 to about 10 by weight. The steam reforming catalyst may be a conventional steam reforming catalyst such as a nickel (Ni)-on-alumina catalyst. However, carbonaceous biomass feedstock contains heavy hydrocarbons and tars that may deactivate conventional steam reforming catalysts over time. Deoxygenation activity decreases with time because of coke/carbon deposits formed on the catalyst. Preferably, known low-coke forming catalysts such as metal substituted apatite and perovskite catalysts may be used as the steam reforming catalysts to resist coking. Such catalysts are described and claimed in U.S. Pat. No. 6,544,439, which is incorporated herein by reference. Such catalysts comprise a crystalline metal oxide component having a chemical composition on an anhydrous basis expressed by an empirical formula of:

$$A_v(B^{t+})_w Ni_x D(G^{u-})_y O_z$$

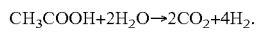

where A is an alkali metal selected from the group consisting of Li⁺, Na⁺, K⁺, Rb⁺, Cs⁺, and mixtures thereof, "v" is the mole ratio of A relative to D and varies from 0 to about 2, B is a basic metal, "w" is the mole ratio of B relative to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G relative to D and varies from 0 to about 2, and "z" is the mole ratio of O relative to D and has a value determined by the equation:

$$z = \tfrac{1}{2}(v + t \cdot w + 2 \cdot x + 5 - u \cdot y),$$

and when B is Ca, "v" is not 0, and when "x" is 0, the catalyst further comprises a nickel component in the framework of the crystalline metal oxide, dispersed thereon, or both, wherein:

B may be selected from the group consisting of $Ca^{2+}$, $Sr^{2+}$, $Pb^{2+}$, $Cd^{2+}$, $Ba^{2+}$, $La^{3+}$, $Eu^{3+}$, $Gd^{3+}$, $Pr^{3+}$, $Nd^{3+}$, $Sm^{3+}$, $Y^{3+}$, $Yb^{3+}$, and mixtures thereof B may comprise a mixture of Sr and a second metal selected from the group consisting of $Ca^{2+}$, $Ba^{2+}$, $La^{3+}$, $Eu^{3+}$, $Gd^{3+}$, $Pr^{3+}$, $Nd^{3+}$, $Sm^{3+}$, $Y^{3+}$, $Yb^{3+}$, and mixtures thereof. The crystalline metal oxide component preferably has an apatite or hydroxyapatite crystal structure. When "x" is greater than 0, a nickel component may be dispersed on the crystalline metal oxide component.

Because step 30 comprises steam reforming only a portion of the oxygenated hydrocarbons into hydrocarbons, a residual portion of oxygenated hydrocarbons remains in the pyrolysis gases. Accordingly, method 10 continues with deoxygenating the residual portion of the oxygenated hydrocarbons in the pyrolysis gases (step 40). The oxygenated hydrocarbons in the residual portion are referred to herein as "residual oxygenated hydrocarbons." Conversion of the residual oxygenated hydrocarbons in the pyrolysis gases into hydrocarbons requires a source of hydrogen gas. The hydrogen gas produced by steam reforming converts at least a portion of the residual oxygenated hydrocarbons into hydrocarbons. However, additional hydrogen gas may be needed to convert more of the residual oxygenated hydrocarbons into hydrocarbons. Preferably, substantially all of the oxygenated hydrocarbons are converted into hydrocarbons. While FIG. 1 shows steps 20, 30, and 40 as separate subsequent steps for illustrative purposes, it will be understood that pyrolyzing (step 20), steam reforming (step 30), and deoxygenating (step 40) are being performed substantially simultaneously in the pyrolysis reactor. In an alternative embodiment, deoxygenating (step 40) may alternatively or additionally be performed in a hydroprocessing reactor 4 (FIG. 2).

Referring again to FIG. 1, additional hydrogen gas may be produced by pyrolyzing the carbonaceous biomass feedstock in the presence of a high temperature water-gas shift catalyst (step 50), in addition to the steam reforming catalyst. As is well known, the water-gas shift reaction is a chemical reaction in which carbon monoxide, in this case produced from steam reforming, reacts with water vapor (steam) to form additional carbon dioxide and additional hydrogen gas according to the following reaction: $CO + H_2O \rightarrow CO_2 + H_2$. Known non-limiting high temperature water-gas shift catalysts include chromium-supported catalysts and iron-based catalysts, and they are sometimes promoted with copper. The effective amount of the high temperature water-gas shift catalyst is expressed in a catalyst-to-biomass ratio of about 0.25 to about 10 by weight.

Additional hydrogen gas may also be produced in a low temperature shift (LTS) water-gas reaction performed outside of the pyrolysis reactor using a low temperature water-gas shift catalyst (step 60) with a separate stream of carbon monoxide, from steam reforming or otherwise. The low temperature water-gas reaction is typically performed in a fixed bed reactor or monolithic reactor 8 (FIG. 2). The low temperature water-gas shift reaction is typically done at temperatures in the range of about 190° C. to about 210° C. Known non-limiting low temperature water-gas shift catalysts include copper on a mixed support comprised of zinc oxide and aluminum oxide. As shown in FIG. 2, the additional hydrogen gas produced from the low temperature water-gas shift reaction may be fed into the pyrolysis reactor 2, into the hydroprocessing reactor 4, or both, for purposes as hereinafter described. The effective amount of the low temperature water-gas shift catalyst is expressed in a catalyst-to-biomass ratio of about 1 to about 10 weight of catalyst per hourly weight feed rate of biomass.

Additional hydrogen gas may also be produced by steam reforming the light hydrocarbons in the pyrolysis gases (step 70). The light hydrocarbons ($C_1$-$C_4$) may be steam reformed at temperatures higher than pyrolysis temperatures, in the range of about 800° C. to about 1000° C. Methane, for example, is steam reformed at temperatures in the range of 900° C. to about 1000° C., which produces carbon oxides and additional hydrogen gas according to the following equation: $CH_4 + H_2O \rightarrow 3H_2 + CO$. Residual oxygenated hydrocarbons not converted by steam reforming during pyrolysis, or otherwise deoxygenated will also be steam reformed at these higher temperatures yielding carbon oxides and additional hydrogen gas. As shown in FIG. 2, the additional hydrogen gas produced from this "high temperature steam reforming" step 70 may be fed into the pyrolysis reactor 2, into the hydroprocessing reactor 4, or both, for purposes as hereinafter described. High temperature steam reforming is typically done in a steam reformer 6 as is well known in the art. The steam reforming catalyst used for steam reforming methane or other light hydrocarbons may be the same steam reforming catalyst used at pyrolysis temperatures.

The hydrogen gas formed by steam reforming and any additional hydrogen gas formed by the high temperature water-gas shift reaction, the low temperature water-gas shift reaction, the high temperature steam reforming step, or otherwise provided, or a combination thereof, deoxygenates at least a portion of the residual oxygenated hydrocarbons in the pyrolysis gases and converts them into hydrocarbons. Deoxygenation may occur in the presence of a hydroprocessing catalyst for most effective hydrogen incorporation. Deoxygenation (step 40) can occur in the pyrolysis reactor 2, in the hydroprocessing reactor 4, or both. Suitable exemplary hydroprocessing catalysts may be metal-based catalysts such as a nickel/molybdenum (Ni/Mo) catalyst, a cobalt/molybdenum (Co/Mo) catalyst, a nickel/tungsten (Ni/W) catalyst, a cobalt/tungsten (Co/W) catalyst, zeolitic catalysts such as those containing structure types LTA, FAU, MOR, MFI, BEA, a combination thereof, or other hydroprocessing catalysts as well known in the art. The metal-based catalysts may be supported on a support material. Typical support materials include metal oxides such as alumina, titania, zirconia, silica-alumina, etc., metal carbides, metal nitrides, carbon, zeolites such as those described above, and others well known in the art. The zeolites may be used as a catalyst or catalyst support material. The effective amount of the hydroprocessing catalyst is expressed as a catalyst-to-biomass ratio of about 0.25 to about 10 weight of catalyst per hourly weight feed rate of biomass if used within the hydroprocessing reactor and as a catalyst-to-biomass ratio of about 0.25 to about 10 by weight if used within the pyrolysis reactor.

While the steam reforming catalyst, the high temperature water-gas shift catalyst, and the hydroprocessing catalyst have been described as separate catalysts, the present invention is not so limited. One or more of these catalysts may be combined into a single catalyst composition. As described previously, the steam reforming catalyst, the hydroprocessing catalyst, and the high temperature water-gas shift catalyst are catalytic solids that may, with and without inorganic inert solids such as sand, serve as the heat transfer medium for a fast pyrolysis process as previously described. However, the heat required to drive the pyrolysis process also may be derived from other sources (e.g., an organic heat carrier such as char) as well known in the art.

Once the carbonaceous biomass feedstock has been pyrolyzed, solid char and pyrolysis gases comprising the condensable portion (vapors) and the non-condensable portion exit the pyrolysis reactor. The solid char may be separated from the pyrolysis gases. The heat transfer medium is separated from the pyrolysis gases. The pyrolysis gases are passed to a condenser 10 (FIG. 2) or series of condensers where they are condensed with the non-condensable portion thereof continuing and recovered (step 90). The non-condensable portion of the pyrolysis gases comprises hydrogen gas, methane, and carbon oxides. The hydrogen gas may be separated from the other non-condensable pyrolysis gases and, as shown in FIG. 2, returned as additional hydrogen gas (step 80) (FIG. 1) to the pyrolysis reactor 2, the hydroprocessing reactor 4, or both. The hydrogen gas may be separated from the other non-condensable reformed pyrolysis gases by known processes such as pressure swing adsorption (PSA), amine scrubbing, membrane separation, or a combination thereof. The methane may be separated by known processes and cycled to a dryer (not shown) to dry the carbonaceous biomass feedstock, to the steam reformer 6 (FIG. 2) for high temperature steam reforming (step 70), or a combination thereof. The carbon oxides may be separated from the other non-condensable reformed pyrolysis gases by known processes, cycled to the dryer to dry the carbonaceous biomass feedstock, purged from the pyrolysis system, and/or may be recycled for other uses.

The condensable portion (vapors) of the pyrolysis gases comprising hydrocarbons and any residual oxygenated hydrocarbons are condensed in the condenser 10 into low oxygen biomass-derived pyrolysis oil having substantially improved energy density, lower corrosivity, and higher thermal stability than conventional biomass-derived pyrolysis oil (step 100). The low oxygen biomass-derived pyrolysis oil has potential for use as a biofuel potentially eliminating the need for or substantially reducing the severity of secondary upgrading to remove oxygen therefrom as is needed with conventional biomass-derived pyrolysis oils.

The ash-laden flue gas is transferred from the reheater 12 to the separation apparatus 14 for separating the ash and the flue gas. As previously described, the flue gas may be recycled to the pyrolysis reactor as the fluidizing gas for the pyrolysis reactor.

FIG. 2 illustrates regeneration of the spent heat transfer medium to remove char and carbon deposits formed thereon. As described previously, the heat transfer medium comprises inert solids, catalytic solids, or both. In the case of catalytic solids, if the catalyst is regenerable, the catalyst may be regenerated and recycled when its activity has dropped below a desired level. The time in which the catalyst will maintain its activity varies. Gradually, there may be a loss of catalyst activity due to fouling (e.g., due to the char/carbon deposits formed on the catalytic solids). Some of the catalytic solids may not be regenerable and such non-regenerable catalytic solids are separated from the inert solids prior to regeneration. In the case of regeneration of the inert solids and regenerable catalysts, regeneration can be performed by discontinuing the flow of hydrogen and any additional hydrogen gas and of the carbonaceous biomass feedstock, separating the spent heat transfer medium from the pyrolysis gases by known methods, and then transferring the spent heat transfer medium from the pyrolysis reactor and/or hydroprocessing reactor to a reheater 12 for regeneration. The heat transfer medium may be regenerated in the reheater by known methods. For example, the heat transfer medium may be regenerated by oxidation at temperatures in the range of about 400° C. to about 550° C. at ambient pressure or slightly above ambient pressure. The temperature may be controlled by using diluted air to control the rate of combustion which substantially prevents the temperature of the heat transfer medium from rising uncontrollably and causing sintering. The regenerated heat transfer medium may then be recycled to the pyrolysis reactor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for producing low oxygen biomass-derived pyrolysis oil from carbonaceous biomass feedstock, comprising the steps of:
    pyrolyzing the carbonaceous biomass feedstock to produce char and pyrolysis gases comprising oxygenated hydrocarbons and steam, the carbonaceous biomass feedstock pyrolyzed in the presence of a steam reforming catalyst to form carbon monoxide, carbon dioxide, and hydrogen gas and to convert a portion of the oxygenated hydrocarbons into hydrocarbons by steam reforming, the hydrogen gas at least partially deoxygenating a residual portion of the oxygenated hydrocarbons; and
    condensing a condensable portion of the pyrolysis gases to form low oxygen biomass-derived pyrolysis oil.

2. The method of claim 1, wherein the step of pyrolyzing the carbonaceous biomass feedstock comprises pyrolyzing the carbonaceous biomass feedstock in the presence of the steam reforming catalyst selected from the group consisting of a nickel (Ni)-on-alumina catalyst and a low-coke forming catalyst selected from the group consisting of metal-substituted apatite and perovskite catalysts.

3. The method of claim 1, wherein the step of pyrolyzing the carbonaceous biomass feedstock further comprises pyrolyzing the carbonaceous biomass feedstock in the presence of a hydroprocessing catalyst.

4. The method of claim 3, wherein the step of pyrolyzing the carbonaceous biomass feedstock further comprises pyrolyzing the carbonaceous biomass feedstock in the presence of a high temperature water-gas shift catalyst to catalyze a water-gas shift reaction in which the carbon monoxide reacts with the steam to form additional carbon dioxide and additional hydrogen gas, the additional hydrogen gas at least partially deoxygenating the residual portion of the oxygenated hydrocarbons.

5. The method of claim 1, wherein the step of pyrolyzing the carbonaceous biomass feedstock further comprises pyrolyzing the carbonaceous biomass feedstock in the presence of a high temperature water-gas shift catalyst to catalyze a water-gas shift reaction in which the carbon monoxide reacts with the steam to form additional carbon dioxide and additional hydrogen gas, the additional hydrogen gas at least partially deoxygenating the residual portion of the oxygenated hydrocarbons.

6. The method of claim 5, further comprising the step of deoxygenating the residual portion of the oxygenated hydrocarbons with additional hydrogen gas produced by reacting the steam with the carbon monoxide at temperatures of about 190° C. to about 210° C. in the presence of a low temperature water-gas shift catalyst, by steam reforming methane in the presence of a steam reforming catalyst at temperatures in the range of about 900° C. to about 1000° C., or a combination thereof.

7. The method of claim 6, wherein the step of deoxygenating the residual portion of the oxygenated hydrocarbons with the additional hydrogen gas comprises deoxygenating in the presence of a hydroprocessing catalyst.

8. The method of claim 7, wherein the step of deoxygenating the residual portion of the oxygenated hydrocarbons comprises supplying the additional hydrogen gas to a pyrolysis reactor, a hydroprocessing reactor, or a combination thereof.

9. The method of claim 1, wherein the step of pyrolyzing the carbonaceous biomass feedstock comprises pyrolyzing the carbonaceous biomass feedstock at pyrolysis temperatures maintained by a heat transfer medium comprised of inert solids, catalytic solids, or both, the catalytic solids selected from the group consisting of the steam reforming catalyst and optionally, at least one of a hydroprocessing catalyst and a high temperature water-gas shift catalyst.

10. The method of claim 1, wherein the step of pyrolyzing the carbonaceous biomass feedstock comprises pyrolyzing the carbonaceous biomass feedstock having a moisture content in the range of about 1 to about 50 weight percent, providing substantially all steam for steam reforming.

11. The method of claim 1, further comprising the step of introducing and distributing additional steam for steam reforming.

12. The method of claim 1, wherein the step of pyrolyzing the carbonaceous biomass feedstock comprises pyrolyzing the carbonaceous biomass feedstock at pyrolysis temperatures maintained by a heat transfer medium comprising at least the steam reforming catalyst.

13. The method of claim 12, wherein the step of condensing a condensable portion of the pyrolysis gases further comprises recycling a non-condensable portion of the pyrolysis gases comprising methane back to a dryer, to a steam reformer, or a combination thereof.

14. A method for producing low oxygen biomass-derived pyrolysis oil from carbonaceous biomass feedstock, comprising the steps of:
    introducing the carbonaceous biomass feedstock into a pyrolysis reactor maintained at pyrolysis temperatures to produce char and pyrolysis gases comprising oxygenated hydrocarbons, methane, and steam;
    steam reforming a portion of the oxygenated hydrocarbons in the pyrolysis reactor in the presence of an effective amount of a steam reforming catalyst to convert a portion of the oxygenated hydrocarbons into hydrocarbons and form carbon monoxide, carbon dioxide, and hydrogen gas;
    deoxygenating a residual portion of the oxygenated hydrocarbons with hydrogen gas and optionally, additional hydrogen gas, in the presence of an effective amount of a hydroprocessing catalyst to form water and to at least partially convert the residual portion of the oxygenated hydrocarbons into hydrocarbons; and condensing a condensable portion of the pyrolysis gases into low oxygen biomass-derived pyrolysis oil.

15. The method of claim 14, wherein the step of deoxygenating the residual portion of the oxygenated hydrocarbons further comprises reacting steam with the carbon monoxide in the pyrolysis reactor in the presence of a high temperature water-gas shift catalyst to form additional carbon dioxide and additional hydrogen gas.

16. The method of claim 14, wherein the step of deoxygenating the residual portion of the oxygenated hydrocarbons further comprises reacting steam with carbon monoxide outside of the pyrolysis reactor at temperatures of about 190° C. to about 210° C. in the presence of a low temperature water-gas shift catalyst to produce additional carbon dioxide and additional hydrogen gas, the additional hydrogen gas supplied to the pyrolysis reactor, a hydroprocessing reactor, or both.

17. The method of claim 14, wherein the step of deoxygenating the residual portion of the oxygenated hydrocarbons further comprises steam reforming the methane in the presence of a steam reforming catalyst at temperatures of about 800° C. to about 1000° C. to produce additional hydrogen gas and carbon oxides, the additional hydrogen gas supplied to the pyrolysis reactor, a hydroprocessing reactor, or both.

18. The method of claim 14, wherein the step of deoxygenating the residual portion of the oxygenated hydrocarbons comprises deoxygenating in the pyrolysis reactor, in a hydroprocessing reactor, or both.

19. The method of claim 14, wherein the step of steam reforming in the pyrolysis reactor in the presence of an effective amount of a steam reforming catalyst comprises selecting the steam reforming catalyst from the group consisting of nickel (Ni)-on-alumina and a low-coke forming catalyst selected from the group consisting of metal-substituted apatite and perovskite catalysts.

20. A method for reducing an oxygen level in condensable pyrolysis gases comprising oxygenated hydrocarbons and steam to produce low oxygen biomass-derived pyrolysis oil therefrom, comprising the steps of:

steam reforming a portion of the oxygenated hydrocarbons in the presence of a steam reforming catalyst to convert a portion of the oxygenated hydrocarbons into hydrocarbons and produce carbon monoxide, carbon dioxide and hydrogen gas;

optionally, producing additional hydrogen gas by reacting steam with the carbon monoxide in the presence of a high temperature water-gas shift catalyst, a low temperature water-gas shift catalyst, or both; and producing water in the presence of a hydroprocessing catalyst by reacting the hydrogen gas from the steam reforming step, and optionally the producing additional hydrogen step, with the oxygen removed by at least partially converting a residual portion of the oxygenated hydrocarbons into hydrocarbons.

* * * * *